J. C. WILSON.
METER.
APPLICATION FILED MAR. 23, 1916.

1,257,568.

Patented Feb. 26, 1918.

Witnesses:

Inventor
John C. Wilson
By: Edwin B. H. Tower, Atty.

J. C. WILSON.
METER.
APPLICATION FILED MAR. 23, 1916.

1,257,568.

Patented Feb. 26, 1918.
5 SHEETS—SHEET 3.

Witnesses:
Robert H. Weir
L. C. Schantz

Inventor
John C. Wilson
Edwin B. H. Power Jr. Atty.

J. C. WILSON.
METER.
APPLICATION FILED MAR. 23, 1916.

1,257,568.

Patented Feb. 26, 1918.
5 SHEETS—SHEET 5.

Witnesses:
Robert F. Weir
L. C. Schantz

Inventor
John C. Wilson
Edwin B. H. Tower Jr. Atty.

UNITED STATES PATENT OFFICE.

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

METER.

1,257,568.     Specification of Letters Patent.     Patented Feb. 26, 1918.

Application filed March 23, 1916. Serial No. 86,163.

*To all whom it may concern:*

Be it known that I, JOHN C. WILSON, a citizen of the United States, residing at Milwaukee, in the county of Milwaukee and State of Wisconsin, have invented new and useful Improvements in Meters, of which the following is a specification.

This invention relates to meters.

It relates particularly to meters for measuring the flow of fluids by imparting heat thereto and determining either the effect of the imparted heat on the fluid or the cooling effect of the fluid on the heater.

Meters of this type generally have an electric heater to impart heat to the fluid and electric resistance thermometers to measure the temperature thereof. The number of units and their relative arrangement vary in different meters.

The location of the resistance thermometers relative to the heater is usually such that the thermometers are affected by the radiant energy from the heater. This radiant energy may affect the temperature of the thermometer without correspondingly affecting the temperature of the transparent medium of gas or other fluid through which the rays pass. Errors may thus be introduced.

One of the objects of the present invention is to provide a meter in which errors due to the effects of radiant energy will be prevented.

Another object is to provide a meter in which the means for preventing errors due to effects of radiant energy is simple and readily removable from the meter for cleaning, inspection or repair.

Another object is to provide an improved heater which will radiate heat energy equally in opposite directions.

Another object is to provide a heater having an improved terminal structure.

Another object is to provide an improved thermometer having means associated therewith for preventing the thermometer being affected by radiant energy from an adjacent source of heat.

Another object is to provide a radiant ray screen for use in connection with meters to prevent errors due to the effect of radiant energy.

Other objects and advantages will hereinafter appear.

The accompanying drawings illustrate several embodiments of the invention.

Before describing the meter the action of radiant energy will be briefly explained.

Figure 1:
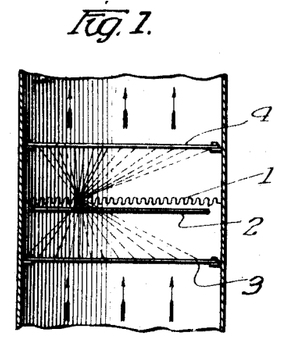
Figure 1 is a diagrammatic view of the heater with thermometer resistances on opposite sides thereof showing the manner in which the rays are emitted from the heater and strike the thermometer resistances.

Radiant energy is transmitted in all directions from a source of heat in straight-line rays as shown in Fig. 1, in which 1 is an electric heater having a terminal structure 2 at one side thereof and 3 and 4 are thermometer resistances on opposite sides of the heater, the illustration being merely diagrammatic. These rays may pass through a medium such as a gas without producing an appreciable effect on the gas. If the surface of a thermometer resistance or other object in the path of the rays is a perfect reflecting surface all the rays will be reflected away and none will be absorbed. Under this condition the temperature of the thermometer resistance will not be affected. If, on the other hand, the surface of the thermometer resistance is a perfect absorbing surface the rays will all be absorbed and none will be reflected. In the latter case the temperature of the thermometer resistance will be raised. Under practical conditions the surface of the thermometer resistance is neither a perfect reflecting nor a perfect absorbing surface.

The thermometer resistances may have their surfaces roughened or covered with a coating of dull shellac or the like to make the absorbing or reflecting power of each unit initially equal. Under practical operating conditions, however, the surfaces change from time to time due to deposits of tar, naphthalene and the like from gas. These deposits are not usually equally distributed over both thermometer resistances and their effects on the thermometer resistances are further unequal for the following reasons:

The gas flows through the meter in one direction only so that the deposits are mostly on one side of the meter units. The thermometer units are generally on opposite sides of the heater and consequently the deposits on one thermometer resistance will be on the side removed from the heater and the deposits on the other thermometer resistance will be on the side near the heater. As a result, the surface of the entrance thermometer resistance facing the heater remains in substantially its initial condition, whereas the surface of the exit thermometer resistance facing the heater is covered with deposits of tar and the like which change its capacity to absorb and reflect heat. An unbalanced condition is consequently produced.

An unequal distribution of the rays may also be caused by the fact that the heater terminal structure 2 is located on one side of the heater and this structure screens a portion of the rays on one side of the heater.

If the rays strike some absorbing surface between the heater and the thermometer units, a substantial portion of the heat energy will be absorbed and transmitted to the gas to raise the temperature thereof. The heat energy will thus be used for the purpose for which it is intended. If all the rays were absorbed without striking the thermometer resistances directly and the absorbed heat dissipated to the flowing gas, an ideal condition would be obtained.

In accordance with the present invention, a meter is provided having means for intercepting and absorbing the rays before they reach the thermometer resistances without interfering with the flow of fluid through the meter. Means is also provided for insuring equal radiation from the heater in opposite directions.

Figure 2:
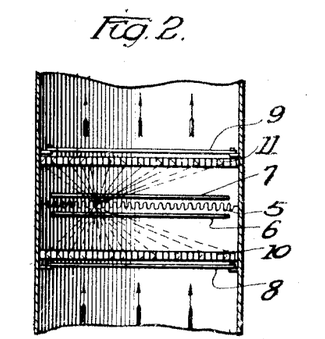
Fig. 2 is a diagrammatic view similar to Fig. 1, illustrating how the rays from the heater are equalized in both directions and screened from the thermometer resistances by the structure herein disclosed.

A diagrammatic illustration of the manner in which the rays are intercepted is shown in Fig. 2. The heater 5 is provided with duplicate terminal structures 6 and 7 on opposite sides thereof so that an equal number of rays will be intercepted in both directions. Located between the heater 5 and the thermometer resistances 8 and 9 are ray screens 10 and 11 which have long narrow tubular openings therethrough which permit free passage of the gas but which intercept and absorb the rays in the manner illustrated.

The meter illustrated in Fig. 3 will first be described.

The meter comprises in general a housing 12 in which is mounted a heater 13 and thermometer units 14 and 15.

The details of the housing 12 and the general structure of the meter units 13, 14 and 15 are fully described in a copending application of J. C. Wilson, Serial No. 86,162, filed March 23, 1916. Accordingly only a brief description will be given herein.

The housing 12 is adapted to be inserted between two sections of a gas main or the like, the ends of the housing being of approximately the same internal diameter as the main to which the meter is attached. The central portion of the housing is enlarged to accommodate the heater and the thermometer units.

The heater unit 13 and the thermometer units 14 and 15 have tubular frames of substantially the same internal diameter as the diameter of the end portions of the housing, said frames being located between and cooperating with tubular sleeves 16 projecting into the enlarged portion of the housing and thereby forming a measuring passage through the meter of substantially the same diameter as the end portions of the housing. The heater and thermometer unit frames have flanges thereon which engage insulating blocks (not shown) in the meter housing so that each unit is supported independently of the others. This construction allows the heater or either of the thermometer units to be quickly removed independently of each other, for cleaning, inspection or repair.

The electric resistance wires of the heater and thermometer units are led out through suitable terminal structures to the exterior of the housing where they are connected to a switch board 17 in a weather-proof junction box 18 mounted on the exterior of the housing.

Figures 5, 6, 7:
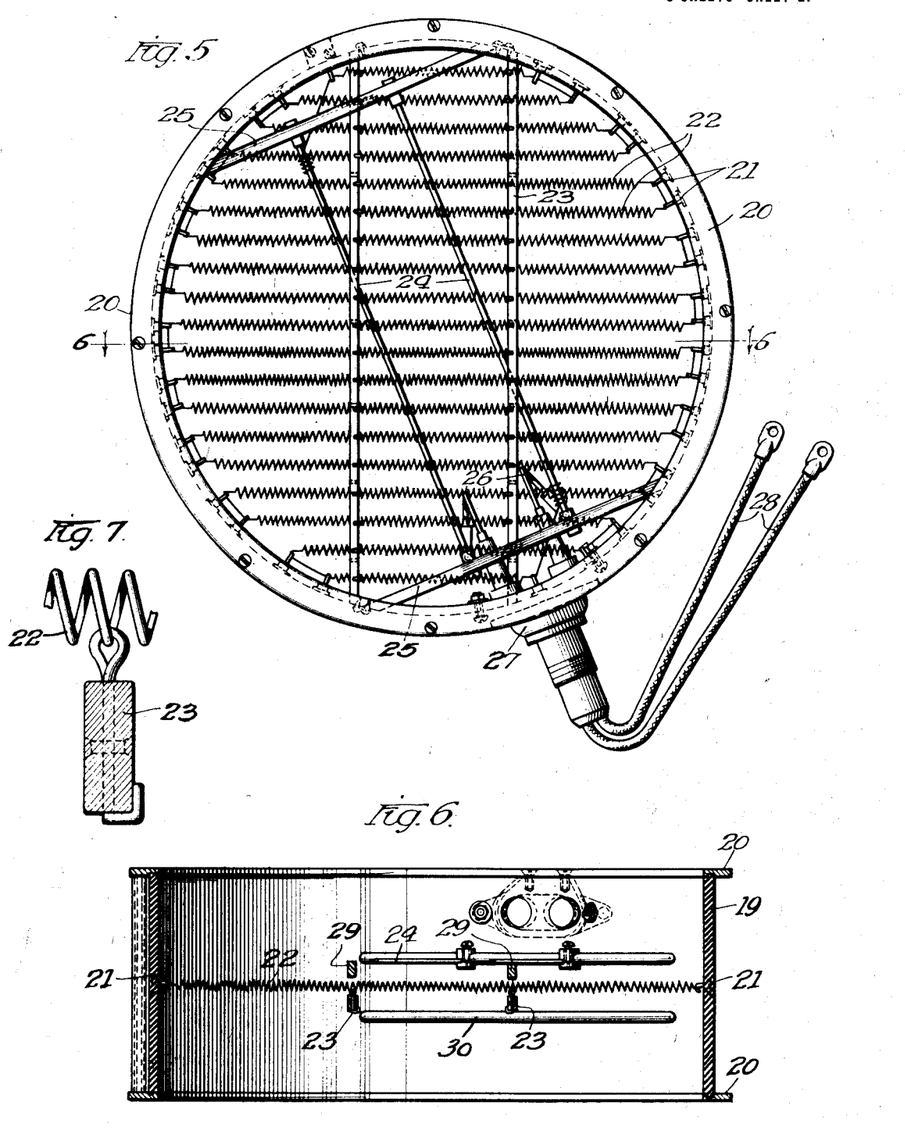
Fig. 5 is a plan view of a heater adapted to be used with the meter herein disclosed.
Fig. 6 is a cross section on the line 6—6 of Fig. 5.
Fig. 7 is a view showing the means used to tie the resistance wire of the heater to the supporting bars.

The electric heater construction for the purpose of insuring equal radiation in opposite directions is shown more particularly in Figs. 5 and 6.

The heater has a tubular frame 19 made of wood or other insulating material, the ends of said frame being surrounded by flanges 20 which strengthen the frame and provide supporting means therefor. Mounted around the periphery of the frame is a plurality of hooks 21 which are arranged in pairs and which support a resistor in the form of a helically coiled resistance wire 22. The resistance wire is strung back and forth from pairs of hooks on one side of the frame to corresponding pairs on the opposite side of the frame and is tied to supporting bars 23 as shown in detail in Fig. 7. The bars 23 are made of any suitable insulating material and extend across the frame on one side of the plane in which the resistance wire is supported.

The resistance wire is connected to terminal rods 24 which are disposed across the frame and supported by insulating bars or rods 25 which are attached to the frame. The rods 24 are connected to conductors 26 which pass out through a suitable terminal 27 to the leads 28. The structure of the heater unit so far described is explained in more detail in the copending application above referred to.

The supporting bars 23 and the terminal rods 24 and their supports 25 tend to screen some of the rays on one side of the heater. This tends to make the distribution of the rays non-uniform and to introduce errors in the meter.

In order to compensate for the effects of the supporting bars a duplicate set of bars 29 is provided which are located on the opposite side of the resistance wire as shown in Fig. 6. A duplicate or dummy terminal structure 30 is also provided which is located on the opposite side of the resistance wire from the actual terminal structure. Of course, the dummy supporting bars could be used as actual supporting bars if desired, and likewise the dummy terminal structure could be utilized as a terminal structure. These extra structures are made of the same size and shape as the actual structures and of material which has substantially the same heat absorbing and heat conducting properties. It should be understood that the details of the extra structures can be changed to suit the requirements and that other obstructions can be introduced to screen an amount of radiant energy equivalent to that screened by the supporting bars and terminal structure. These obstructions can be made a part of the heater or they can be located adjacent thereto but independent thereof.

Figure 8:
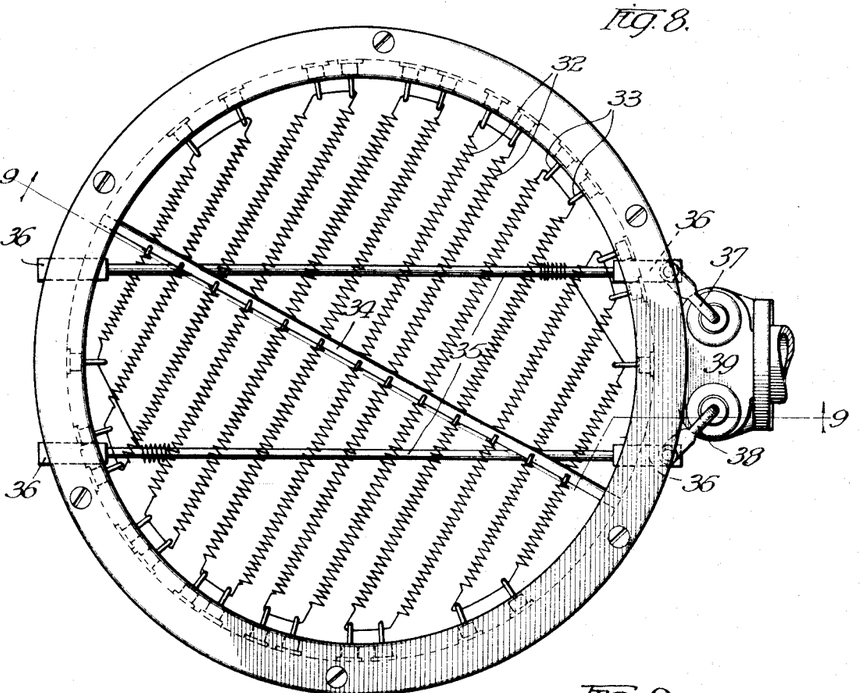
Fig. 8 is a plan view of an alternative form of heater adapted to be used with the meter.
Figure 9:
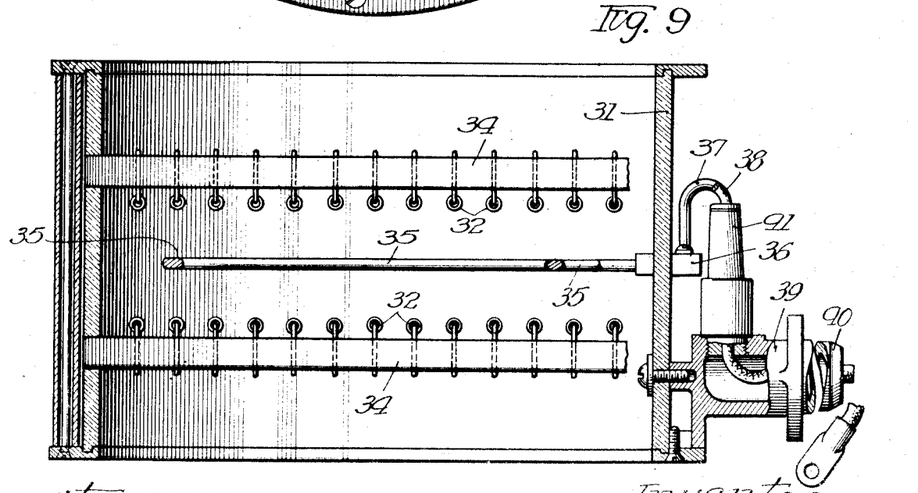
Fig. 9 is a cross section view of the heater on the line 9—9 of Fig. 8.

Another heater adapted for the meter is shown in Figs. 8 and 9.

This heater has a frame 31 and a resistor 32 in the form of a helically coiled resistance wire supported by hooks 33, all of said parts being similar to the corresponding parts of the heater above described.

The resistance wire in this form of heater is supported in two planes as shown in Fig. 9 which are spaced some distance apart. The supporting rods 34 to which the resistance wire is tied extend across the heater frame outside of the respective planes of resistance wire. The arrangement of supporting bars is accordingly symmetrical and the screening of the radiant energy rays is equal in both directions.

The terminal rods 35 for the resistance wire are mounted between the two planes of resistance wire so that the effect of the terminal structures on the radiant energy from the heater is equal in opposite directions. The rods extend across the frame and through the same, their ends being received in suitable conducting blocks 36 which are tightly fitted in the heater unit frame. The conductors 37 and 38 from the outlet terminal 39 are connected to the rods 35 on the outside of the heater frame as shown in Fig. 9. This structure avoids the necessity of having a terminal or outlet projecting within the inner area bounded by the heater frame. The interior of the heater is thus free from unnecessary obstructions.

The outlet terminal 39 is constructed so as to be bolted to the exterior of the frame as shown in Fig. 9. It has an extension 40 adapted to project through an opening in the meter housing. The leads 37 and 38 enter the terminal through insulating bushings 41 and pass through the extension 40 to the exterior of the meter housing.

It will thus be seen that a heater is provided in which the supporting bars and the terminal rods are arranged symmetrically with relation to the resistance wire thereby insuring equal radiation in opposite directions without requiring duplicate or dummy structures. The location of the terminal on the outside of the frame adds to the efficiency of the heater by reducing the number of obstructions to the flow of gas.

When the meter is provided with a heater of either of the types described, the radiant energy from the heater is substantially equal in opposite directions. This tends to equalize the effects of the radiant energy and to decrease errors in the meter. However, the thermometer resistances often do not have equal reflecting and absorbing powers as above described, and to compensate for this condition additional means is provided for protecting the thermometer units from the rays from the heater.

The meter disclosed herein is provided with ray screens having long, narrow spaces through which the gas can pass without changing direction, but through which only those rays which lie in the direction of gas flow can pass. These screens obstruct and absorb a large percentage of the rays and prevent them from striking the thermometer resistances. The effects from any rays not absorbed by the screens will be negligible.

Figure 3:
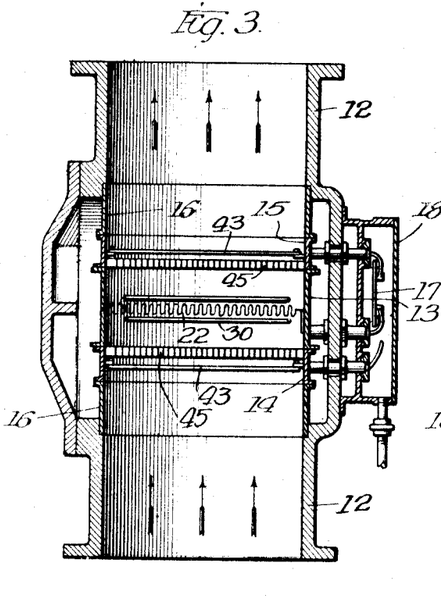
Fig. 3 is a longitudinal section of a vertical type of meter embodying the invention.

The screens shown in the meter illustrated in Fig. 3 are incorporated in the thermometer units 14 and 15. One of these thermometer units is shown in detail in Figs. 10 and 11.

Figure 10:
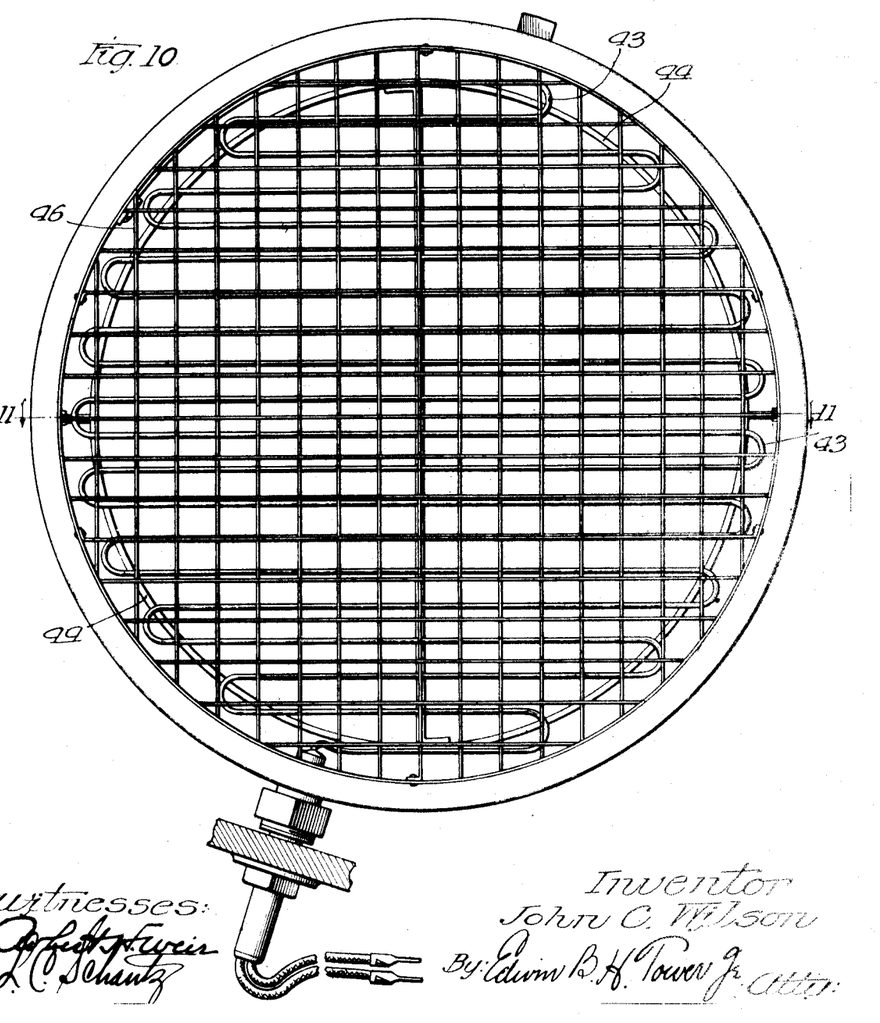
Fig. 10 is a plan view of the thermometer unit adapted to be used with the meter.
Figure 11:
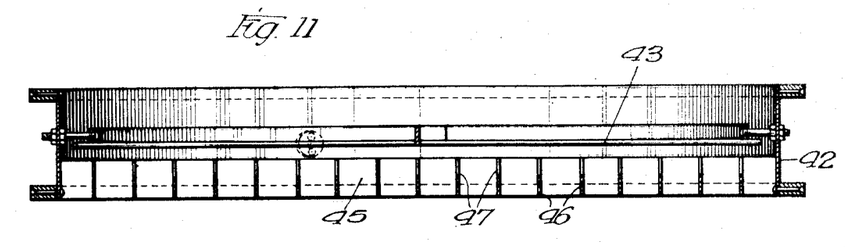
Fig. 11 is a cross section on the line 11—11 of Fig. 10.

The thermometer unit has a tubular frame 42 having a metal incased resistor 43 supported over the area inclosed by the frame by means of a ring-shaped support 44 of small mass. The details of the frame and support and the advantages thereof are clearly set forth in the copending application referred to and accordingly will not be further described herein.

Mounted within the frame 42 is a ray screen 45 comprising a multiplicity of thin, flat, metal strips 46 which are arranged parallel to each other in two sets, one set being at right angles to the other. The strips are provided with suitable notches 47 so that one set may fit over the other and thereby form a screen having a large number of long, narrow, tubular openings which in this instance are rectangular. Certain of the strips are riveted to the frame so that the screen is supported by the thermometer unit.

The strips are spaced relatively close together and they are of such width that the tubular openings are relatively long and narrow. The rays which strike the walls of the openings at an angle are either immediately absorbed by the walls or may be partially reflected to the opposite walls where they are absorbed. The surfaces of the walls are treated so as to make them good absorbing surfaces. This may be done by roughening the surfaces or by covering them with dull, black lacquer or other material which will give them a dull black color.

The screen will thus absorb the radiant energy from the heater without forming any substantial obstruction to the flow of gas through the meter. Only the rays that are parallel to the direction of flow will be able to pass through the screen. The number of these rays is not sufficient to appreciably affect the meter.

Of course, a screen having long, narrow openings therein may be provided by construction other than the one herein described. Such structures are included within the spirit and scope of the present invention, the embodiment shown being merely for the purpose of illustrating the present preferred form.

Figure 4:
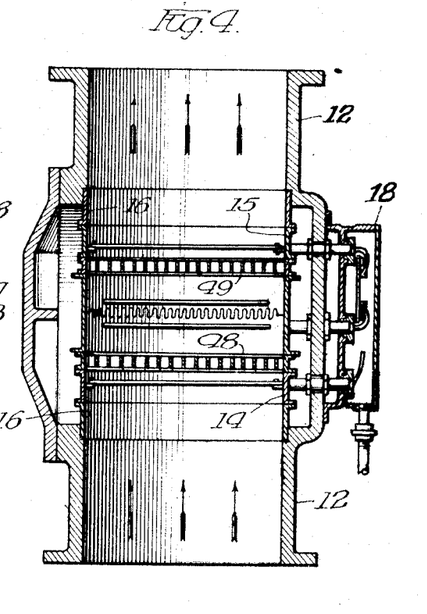
Fig. 4 is a longitudinal section of another meter embodying the invention.

A meter having ray screens which are independent of the measuring elements of the meter is shown in Fig. 4. This meter is of the same type as that illustrated in Fig. 3 and corresponding reference numerals have been used to indicate like parts. Ray screens 48 and 49 which are similar in construction are located between the heater and the thermometer units.

Figures 12, 13:
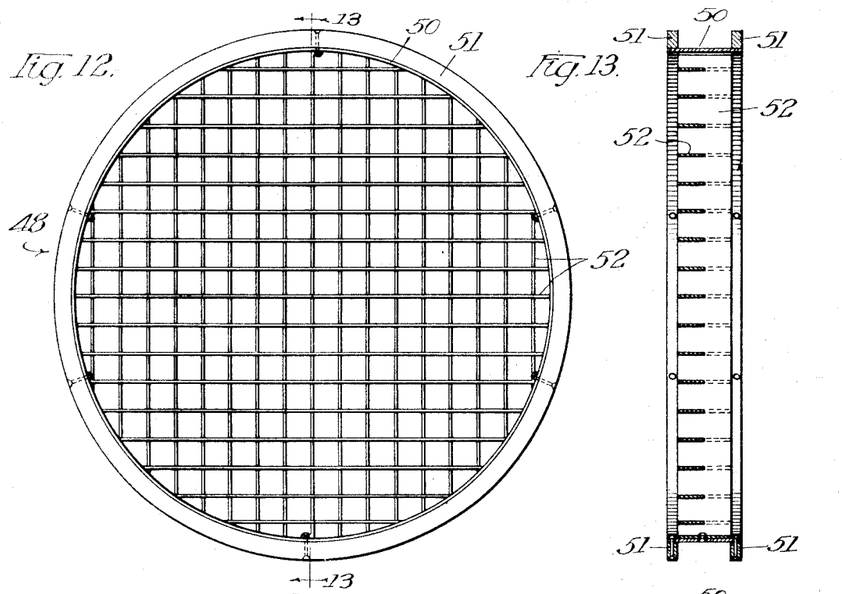
Figs. 12 and 13 are plan and cross section views respectively of a ray screen, Fig. 13 being taken on the line 13—13 of Fig. 12.

Each ray screen has a tubular frame 50 (Figs. 12 and 13) of the same general construction as the frames of the thermometer units, flanges 51 being provided so that the frame may be independently supported in the meter housing. The frame supports a plurality of thin metal strips 52 which are arranged in the same manner as the strips in the thermometer unit shown in Figs. 10 and 11 to form a screen having long narrow openings therethrough. This screen may be independently mounted as a unit in the meter housing between the heater and the thermometer units where it serves to intercept and absorb the rays from the heater. The screen may be readily removed from the meter independently of the other units.

Figures 14, 15:
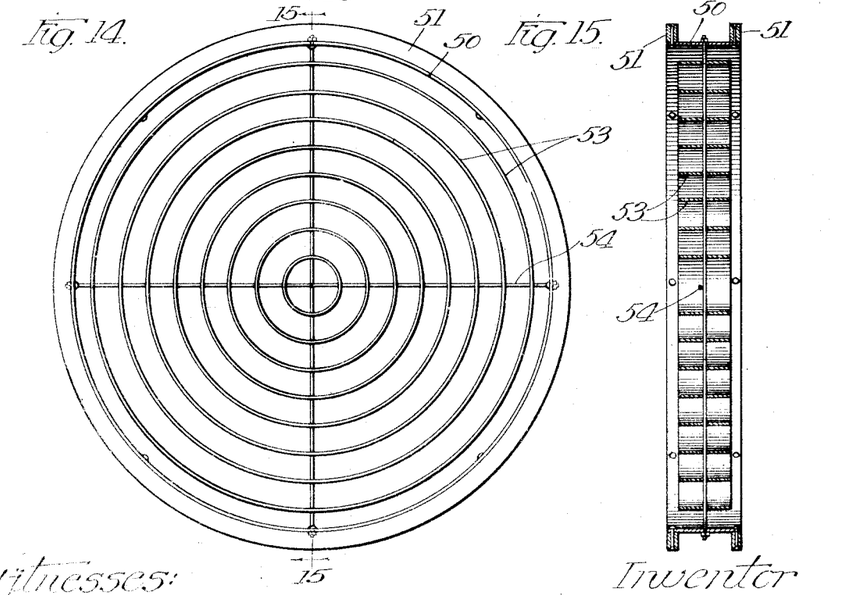
Figs. 14 and 15 are plan and cross section views respectively of a modified form of ray screen, Fig. 15 being taken on the line 15—15 of Fig. 14.

Another construction of ray screen is illustrated in Figs. 14 and 15.

This screen has a tubular frame 50 provided with flanges 51 similar to the corresponding elements of the screen previously described. The long, narrow openings are, however, provided by means of a plurality of concentrically arranged cylindrical sleeves 53 which are supported from the frame by means of suitable rods 54. This construction provides a screen having long, narrow, annular openings through which the gas may pass. The structure is simple and effective and it offers a minimum obstruction to the flow of gas.

It will thus be seen that a meter has been provided in which the heating means is constructed so that the radiant energy therefrom will be equal in opposite directions. The radiant energy effective to modify the temperature of the thermometer resistances is therefore equal for both thermometer units. The thermometer resistances are protected from these rays by screens of like character which absorb the radiant energy and transfer the heat to the gas. The thermometer resistances are accordingly protected from the radiant energy effects and errors in the meter are prevented. The construction of the heater is simple and capable of easy manufacture and ready assembly. The ray screens are likewise simple and they are arranged so that they constitute a part of the thermometer units or they may be constructed as separate units which are removable from the meter independently of the other units.

It is to be understood that the structure shown is for the purpose of illustration only and that other structures may be devised which embody the invention and which come within the spirit and scope of the appended claims.

What I claim is:—

1. A fluid meter having a housing, means within the housing for imparting heat to the fluid flowing therethrough, thermometer elements adjacent the heating means, and means for preventing said elements from being affected directly by the radiant energy from the heating means.

2. A fluid meter having a housing, means within the housing for imparting heat to the fluid flowing therethrough, thermometer elements adjacent the heating means, and means for deflecting and absorbing the radiant energy from the heating means without obstructing the flow of fluid to prevent said energy affecting said elements directly.

3. A fluid meter having a housing, an electric heater within said housing for imparting heat to the fluid flowing therethrough, electric thermometer resistances for measuring the temperature of the fluid, and means for preventing the thermometer resistances being affected directly by the heat rays from the heater, said means being adapted to permit free flow of the fluid being measured.

4. A fluid meter having a housing, an electric heater within the housing for imparting heat to the fluid flowing therethrough, electric thermometer resistances on opposite sides of the heater for measuring the temperature of the fluid before and after heating, and ray screens between the heater and the thermometer resistances for protecting the thermometer resistances from heat rays from the heater.

5. A fluid meter having a housing, an electric heater within the housing for imparting heat to the fluid flowing therethrough, electric thermometer resistances for measuring the temperature of said fluid, and means for preventing the thermometer resistances being affected directly by the heat rays from the heater, said means comprising a screen having relatively long, narrow openings therethrough, the walls of which deflect and absorb the rays but allow free passage for the fluid being measured.

6. A fluid meter having a housing, means within the housing for imparting heat to the fluid flowing therethrough, thermometer elements on opposite sides of the heating means, and means for insuring that the radiant energy from the heating means is absorbed and deflected in like degree on both sides of the heating means to prevent unbalanced effects on said elements.

7. A fluid meter having a housing, an electric heater within said housing, said heater having means associated there with to insure equal radiation in opposite directions, thermometer elements adjacent said heater for measuring the temperature of the fluid, and means between the heater and the thermometer elements for preventing the radiant energy reaching the thermometer elements, said means permitting free flow of the fluid being measured.

8. A thermal fluid meter having a housing, an electric heater and electric thermometer units within said housing, said electric heater and thermometer units being adapted to be supported independently in said housing so that each may be removed independently of the others, and means carried by the thermometer units for protecting them against the effects of radiant energy from the heater.

9. A thermal fluid meter having a housing, an electric heater and electric thermometer units within said housing, said heater and thermometer units being adapted to be supported independently in said housing so that each may be removed independently of the others, and ray screens carried by the thermometer units for protecting them against the effects of radiant energy from the heater.

10. A thermal fluid meter having a housing, an electric heater and electric thermometer units therein, said heater and thermometer units having tubular frames adapted to form a measuring passage in said housing, said frames being spaced from said housing and adapted to be supported thereby so that each may be readily removed independently of the others, and means carried by said thermometer units for protecting them against the effects of radiant energy from the heater.

11. A thermal fluid meter having a heater comprising a frame, an electric resistor carried by said frame and distributed over the area inclosed thereby, means for insuring that the radiant energy from the resistor is equal in opposite directions, and thermometer elements adjacent said heater.

12. A thermal fluid meter having a heater comprising a supporting frame, an electric resistance wire carried by said frame and distributed over the area inclosed thereby, a terminal structure on one side of said resistance wire to which the wire is connected, a duplicate structure on the other side of said wire for insuring equal radiation from the heater in both directions, and thermometer elements adjacent said heater.

13. A thermal fluid meter having a heater comprising a frame of insulating material, an electric resistance wire, means carried by said frame for supporting said wire so that the wire is distributed over the inner area bounded by said frame, a pair of terminal rods carried by said frame and disposed thereacross adjacent to and on one side of said resistance wire, duplicate rods on the other side of said wire for insuring equal radiation from the heater in both directions, and thermometer elements adjacent said heater.

14. A thermal fluid meter having a heater comprising a frame of insulating material, an electric resistance wire, means carried by said frame for supporting said wire so that it is distributed over the inner area bounded by said frame, supporting rods extending across said frame said wire being tied to said rods, terminal rods carried by said frame on one side of said resistance wire, duplicate supporting and terminal rods for insuring that the effective radiation from the resistance wire is equal in both directions, and thermometer elements adjacent said heater.

15. A resistance thermometer element having a frame, an electric resistance wire supported by and distributed over substantially the entire area inclosed by said frame, and means carried by said frame for protecting the resistance wire against radiant energy from a source of heat adjacent said element.

16. A resistance element comprising a frame, an electric resistance wire supported by and distributed over substantially the entire area inclosed by said frame, and a ray screen carried by said frame for protecting the resistance wire against radiant energy from a source of heat adjacent said element.

17. A resistance thermometer element comprising a frame, a resistance wire supported by and distributed over the area inclosed by said frame, and means for protecting the resistance wire against radiant energy from a source of heat adjacent said element, said means comprising a screen having a plurality of relatively long, narrow openings therethrough, the walls of which deflect and absorb the radiant energy.

18. The combination with a heater of thermometer elements responsive to the temperature of a medium affected by said heater, and means for preventing the thermometer elements being affected directly by the energy radiated from the heater.

19. The combination with a heater of thermometer elements responsive to the temperature of a flowing fluid affected by said heater, and means for preventing the thermometer elements being affected directly by the radiant energy from the heater, said means permitting free flow of the fluid.

20. In a flowing fluid, a heater, thermometer elements adjacent the heater, and means which permits free flow of the fluid adapted to prevent the radiant energy from the heater affecting said elements directly.

21. The combination with a heater adapted to heat a flowing stream of fluid, of thermometer units adjacent the heater for measuring the temperature of said fluid, and means for deflecting and absorbing the radiant energy from the heater and dissipating it to the fluid without obstructing the flow thereof to prevent said energy affecting the thermometer units directly.

22. The combination with a heater adapted to heat a stream of fluid without obstructing the flow thereof, of thermometer elements for measuring the temperature of said fluid without obstructing the flow thereof, and means for preventing the radiant energy from the heater affecting said elements directly, said last-named means also permitting free flow of the fluid.

23. The method of preventing radiant energy from a heater in a flowing stream of fluid affecting directly temperature responsive elements in said stream which consists in absorbing and deflecting the rays and dissipating their energy to the flowing fluid before they reach the temperature responsive elements.

24. The method of preventing radiant energy from the heater in a flowing stream of fluid from being dissipated unequally in opposite directions when some of the rays are absorbed at one side of the heater which consists in absorbing some of the rays at the other side of the heater to make the radiant energy from the heater equal in opposite directions.

25. The method of preventing a temperature responsive element located in a stream of fluid being affected directly by rays from a source of radiant energy which consists in absorbing the rays and dissipating their energy to the stream of fluid before they reach the temperature responsive element.

In witness whereof, I have hereunto subscribed my name in the presence of two witnesses.

JOHN C. WILSON.

Witnesses:
FLORENCE CHASE,
L. C. SCHAUTZ.